United States Patent
Oana

(10) Patent No.: US 7,121,517 B2
(45) Date of Patent: Oct. 17, 2006

(54) CUP HOLDER ASSEMBLY WITH SLIDING PARTIAL RING

(75) Inventor: Adrian Oana, Windsor (CA)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/923,427

(22) Filed: Aug. 20, 2004

(65) Prior Publication Data

US 2006/0038101 A1    Feb. 23, 2006

(51) Int. Cl.
A47K 1/08      (2006.01)
B60R 7/00      (2006.01)

(52) U.S. Cl. .................................. 248/311.2; 224/281

(58) Field of Classification Search ............ 248/311.2, 248/316.1, 315, 316.4; 224/400, 483, 281, 224/282, 545, 548, 552, 553
See application file for complete search history.

(56) References Cited

U.S. PATENT DOCUMENTS

| | | | |
|---|---|---|---|
| 4,953,771 A | 9/1990 | Fischer et al. ............... 224/549 |
| 5,190,259 A * | 3/1993 | Okazaki ................... 248/311.2 |
| 5,289,962 A | 3/1994 | Tull et al. ................... 224/549 |
| 5,524,958 A | 6/1996 | Wieczorek et al. .... 297/188.17 |
| 5,618,018 A | 4/1997 | Baniak ..................... 248/311.2 |
| 5,673,891 A | 10/1997 | Fujihara et al. .......... 248/311.2 |
| 5,692,658 A * | 12/1997 | Fischer et al. ............... 224/281 |
| 5,762,307 A * | 6/1998 | Patmore .................. 248/311.2 |
| 5,791,616 A * | 8/1998 | Volkmann et al. ........ 248/311.2 |
| 5,944,240 A * | 8/1999 | Honma ........................ 224/281 |
| 6,010,047 A * | 1/2000 | Osborn ....................... 224/281 |
| 6,234,438 B1* | 5/2001 | Plocher et al. ........... 248/311.2 |
| 6,349,913 B1* | 2/2002 | Jankowski ............... 248/311.2 |
| 6,685,152 B1* | 2/2004 | Shirase et al. ........... 248/311.2 |
| 6,702,241 B1* | 3/2004 | Harada .................... 248/311.2 |
| 6,837,470 B1* | 1/2005 | Pacher et al. ............ 248/311.2 |
| 6,854,699 B1* | 2/2005 | Nishizawa ............... 248/311.2 |

* cited by examiner

Primary Examiner—Anita M. King
(74) Attorney, Agent, or Firm—Laura C. Hargitt

(57) ABSTRACT

A cup holder assembly includes a receptacle. A base defining a recess is also included. The base is pivotable with respect to the receptacle between a stored position in which the base is substantially inside the receptacle and a use position in which the base is at least partially outside the receptacle. A partial ring is supported by the receptacle and slides in the channel in one direction such that the partial ring is contained substantially within the channel when the base is in the stored position and slides in the channel in another direction to extend between the receptacle and the base when the base is in the use position to cooperatively form with the base a circumferential support for receiving and at least partially supporting a container.

14 Claims, 3 Drawing Sheets

CUP HOLDER ASSEMBLY WITH SLIDING PARTIAL RING

TECHNICAL FIELD

This invention relates to a cup holder assembly for use in a vehicle.

BACKGROUND OF THE INVENTION

Cup holders are typically provided in vehicles for both front and rear passengers. Some cup holders are collapsible to be hidden from view when not in use. Cup holders may be packaged within the instrument panel, the console or the doors of a vehicle. Designers continue to strive for ways to reduce the packaging size and the number of parts required for functional cup holders.

SUMMARY OF THE INVENTION

The invention provides a cup holder assembly including a receptacle. A base defines a recess pivotable with respect to the receptacle between a stored position in which the base is substantially inside of the receptacle and a use position in which the base is at least partially outside of the receptacle. The cup holder assembly further includes a partial ring supported by the receptacle. The partial ring is sufficiently slidable in one direction with respect to the base such that the partial ring is storable substantially within the base when the base is in the stored position and slides in another direction with respect to the base when the base is in the use position to cooperatively form with the base a circumferential support for receiving and at least partially supporting a container.

In another aspect of the invention, a support arm is pivotably connected to the base and is pivotable between a first position wherein the arm is nested substantially within the recess and is coplanar with the base, and a second position wherein the arm extends at least partially below the base for supporting the container. The arm pivots between the first and second positions in conjunction with the base pivoting between the stored position and the use positions, respectively.

In a yet another aspect of the invention, a cam element is connected to the arm. The receptacle forms a sloped surface. The cam element follows the sloped surface as the base pivots from the stored position to the use position to permit pivoting of the arm from the first position to the second position. Preferably, a torsion spring biases the arm toward the second position.

In a further aspect of the invention, the receptacle forms a grooved track. A portion of the partial ring is captured within the track when the partial ring slides in the one direction with respect to the base, the track thereby guiding the partial ring in forming the circumferential support with the base.

In a still further aspect of the invention, a torsion spring biases the base toward the use position. A latch is operable for latching the base in the stored position. The torsion springs pivots the base from the stored position to the use position when the latch is unlatched.

In yet another aspect of the invention, the cup holder assembly further includes a gear disposed concentrically with the torsion spring. A motion damper is engaged with the gear. Pivoting of the base via the torsion spring from the stored position to the use position is dampened by the motion damper. The gear may be integrally formed with the base.

In a still further aspect of the invention, the container is characterized by a first size and the circumferential support is characterized by a first radius. A stabilizing tab is pivotably connected to the base and is moveable between a retracted position in which the stabilizing tab is contained substantially within the base and an extended position in which the stabilizing tab extends from the base. The stabilizing tab cooperates with the base and the partial ring to form an alternate circumferential support characterized by a second radius. The second radius is less than the first radius. The stabilizing tab thereby effectively reduces the size of the circumferential support to permit support of a different container characterized by a second size less than the first size. Preferably, a torsion spring biases the stabilizing tab toward the extended position.

In a still further aspect of the invention, the stabilizing tab abuts the partial ring when the stabilizing tab is in the retracted position and the base is in the stored position. The partial ring thereby prevents movement of the stabilizing tab to the extended position when the base is in the stored position, and permits movement of the extended tab to the extended position when the partial ring slides with respect to the base to extend sufficiently out of the base.

In yet a further aspect of the invention, the base forms a channel. The partial ring is slidable in the channel in the one direction such that the partial ring is storable substantially within the channel when the base is in the stored position and is sufficiently slidable in the channel in the other direction to extend sufficiently out of the channel when the base is in the use position to cooperatively form with the base the circumferential support.

In yet a further aspect of the invention, the circumferential support is characterized by a first diameter. The receptacle is characterized by a width and a length. The width of the receptacle is less than the first diameter of the circumferential support. Accordingly, the sliding partial ring of the invention enables a packaging arrangement with a minimally sized receptacle.

In accordance with another aspect of the invention; a cup holder assembly includes a receptacle and a base. The base is configured with a recess and pivotable in a common plane with respect to the receptacle between a stored position juxtaposed with the recess and a usable position out of juxtaposition with the recess to form with the base a support for the container when the base is not stored.

Another aspect of the invention provides a collapsible cup holder of reduced size including a first portion defining a packaging space of reduced size. A second portion is pivotable in a common plane with respect to the first portion. The second portion has a first partial ring in the common plane sufficiently configured to partially support the cup and of sufficiently reduced size to fit in the reduced size packaging space. A third portion is collapsible with respect to the second portion in the common plane of the second portion and has a second partial ring in the common plane sufficiently configured to complete the support of the cup when the third portion is not collapsed and to fit within the reduced size packaging space when the third portion is collapsed.

In another aspect of the invention, the cup is characterized by a circumference and a bottom. The second and third portions support the cup circumferentially. The collapsible cup holder further includes a fourth portion pivotable with respect to the first portion. The fourth portion is configured to support the bottom of the cup when the third portion is not collapsed. When the third portion is collapsed, the fourth portion nests within a recess defined by the first planar partial ring and fits within the reduced size packaging space.

The above features and advantages and other features and advantages of the present invention are readily apparent from the following detailed description of the best modes for carrying out the invention when taken in connection with the accompanying drawings.

DESCRIPTION OF THE PREFERRED EMBODIMENT

Figure 1:
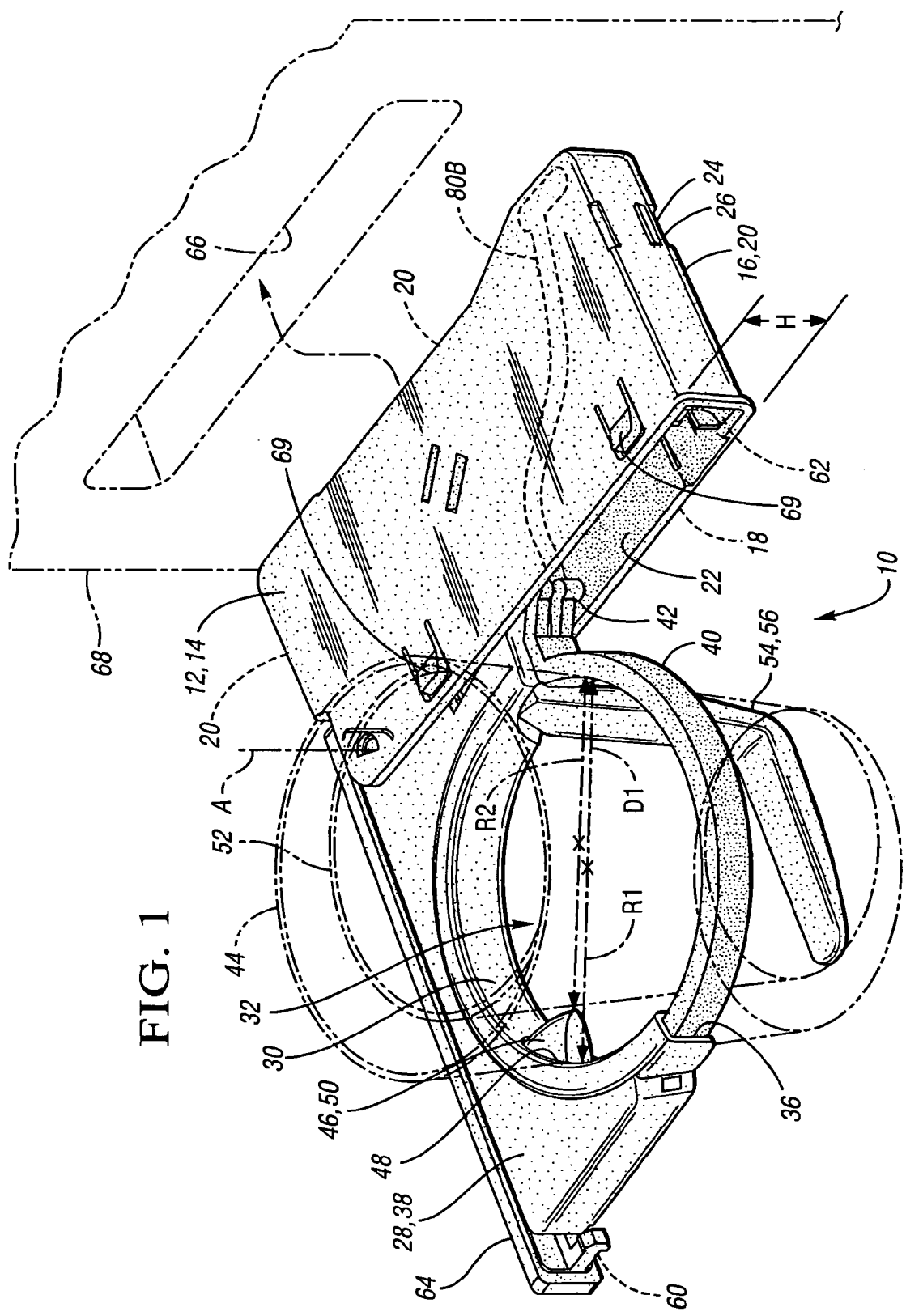
FIG. 1 is a schematic perspective illustration of a cup holder assembly having a sliding partial ring in a use position.

Referring to the drawings, wherein like reference numerals refer to like components, a cup holder assembly 10 is depicted in FIG. 1. The cup holder assembly 10 includes a receptacle 12 which may also be referred to herein as a housing or a first portion. The receptacle 12 includes a top portion 14 which is configured to fit with a bottom portion 16. The bottom portion 16 includes a bottom surface 18 as well as sidewalls 20 (one shown in FIG. 1). The top portion 14 and the bottom portion 16 are cooperatively configured to form a receptacle opening 22 (which may be referred to herein as a reduced size packaging space). Preferably, the top portion 14 and the bottom portion 16 snap-fit together via a plurality of snap-in tabs 24 extending from the periphery of the top portion 14 (one tab shown in FIG. 1) into complementary tab openings 26 formed in the bottom portion.

The cup holder assembly 10 further includes a base 28 which may also be referred to herein as a second portion. The base 28 defines a recess 30 which forms a portion of a circle 32. The base 28 forms a channel 36. The channel 36 tracks the recess 30. The base 28 is pivotably connected to the receptacle 12 about an axis A. The base 28 pivots between a use position 38 shown in FIG. 1 and a stored position (shown in and discussed with respect to FIG. 2). In the use position 38, the base is substantially outside of the receptacle 12. In both the use position and the stored position, the base 28 and the receptacle 12 are co-planar (i.e., they share a common plane), as is readily apparent from the drawings.

A partial ring 40 is supported at a support end 42 which may also be referred to as a peg at the receptacle 12. The partial ring 40 is slidable within the channel 36 in a direction out of the channel so that the partial ring 40 extends between the receptacle 12 and the base 28 when the base 28 is in the use position 38 as shown in FIG. 1. When the partial ring 40 extends in this fashion to a usable position, the partial ring 40 and the base 28 cooperate to form a circumferential support 28, 40 for receiving and partially supporting a first size beverage container 44 shown in phantom. The base 28 defining the recess 30 may be referred to herein as a first planar partial ring. Additionally, the partial ring 40 may be referred to herein as a third portion or a second planar partial ring. The circumferential support 28, 40 is characterized by a first radius R1 and a corresponding first diameter D1 and defines the circle 32.

A stabilizing tab 46 is spring-biased to extend into the portion of the circle 32 formed by the recess 30 from a stabilizing tab opening 48 formed in the base 28 to an extended position 50. With the stabilizing tab 46 in the extended position 50, an effective alternate support 40, 46 is formed by partial ring 40 and the stabilizing tab 46. The alternate support 40, 46 is characterized by a second radius R2. Notably, the second radius R2 is less than the first radius R1. Accordingly, when the stabilizing tab 46 is in the extended position 50, the cup holder assembly 10 may be utilized for supporting a second size beverage container 52 (shown in phantom) which is smaller than the first size beverage container 44.

A support arm 54 extends from the base 28 in a supportive position 56 (which may also be referred to herein as a second position). In the supportive position 56, the support arm 54, which may be referred to herein as a fourth portion, extends below the circumferential support 28, 40 (and also below the alternate support 40, 46). In this position, the support arm 54 is operable for supporting either the first size beverage container 44 or the second size beverage container 52 from below.

The base 28 includes a latch striker 60. A latch mechanism 62 is connected to the receptacle 12. The latch striker 60 and the latch mechanism 62 are matable for latching the base 28 to the receptacle 12 (as shown and further discussed with respect to FIG. 2). A cover 64 is mounted to the base 28 and is operable for covering the receptacle opening 22 as shown in and discussed further with respect to FIG. 2.

Figure 3:
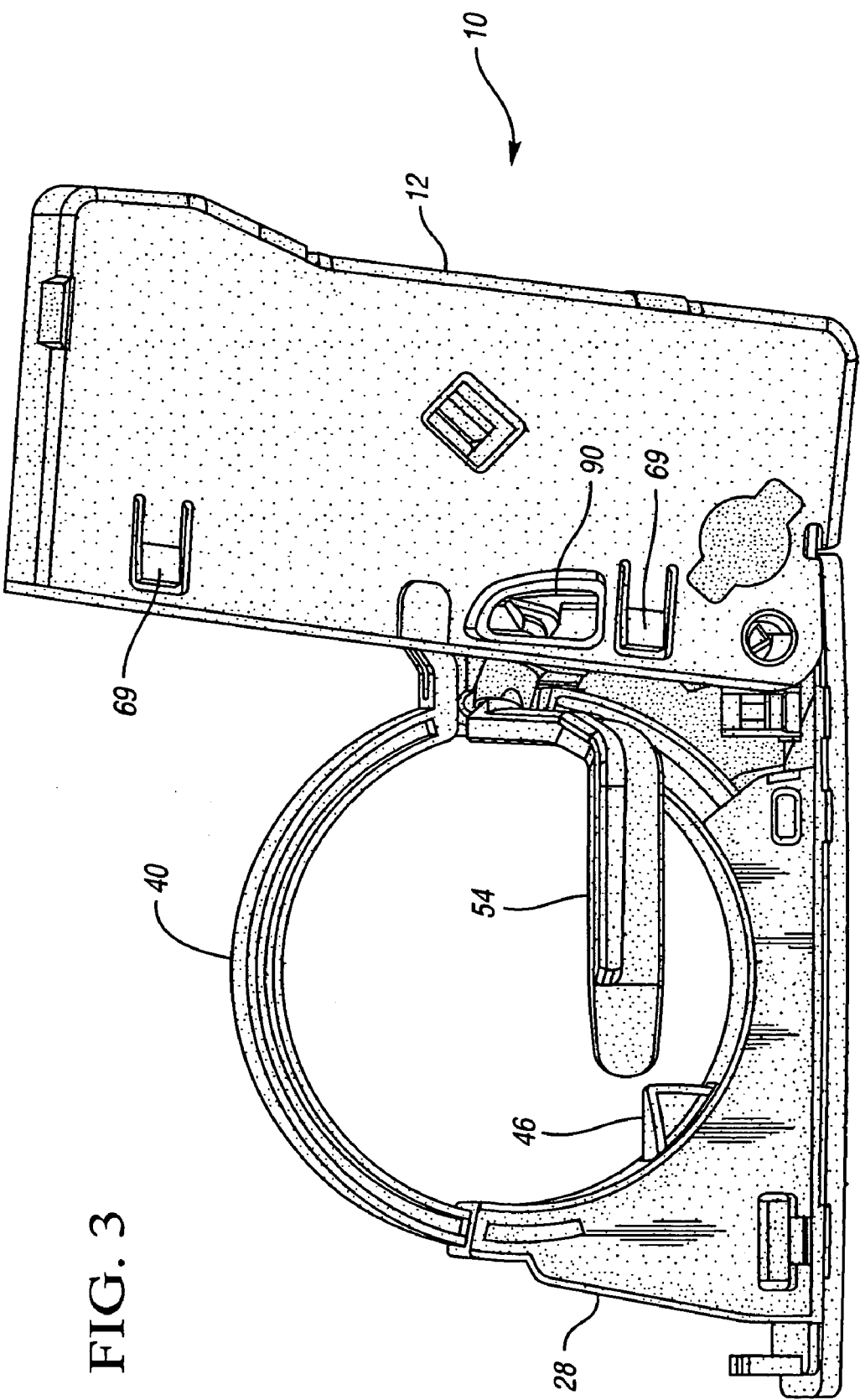
FIG. 3 is a schematic perspective illustration in rotated view of the cup holder assembly of FIG. 1.

The receptacle 12 is sized to be received within a corresponding slot 66 formed in vehicle structure 68. The vehicle structure 68 may be a console or an instrument panel, for example. Four tabs 69 (two shown in FIG. 1 formed in the top portion 14 of the receptacle 12 and two shown in FIG. 3 formed in the bottom portion 16 of the receptacle 12) are utilized to hold the receptacle 12 within the slot 66.

Figure 2:
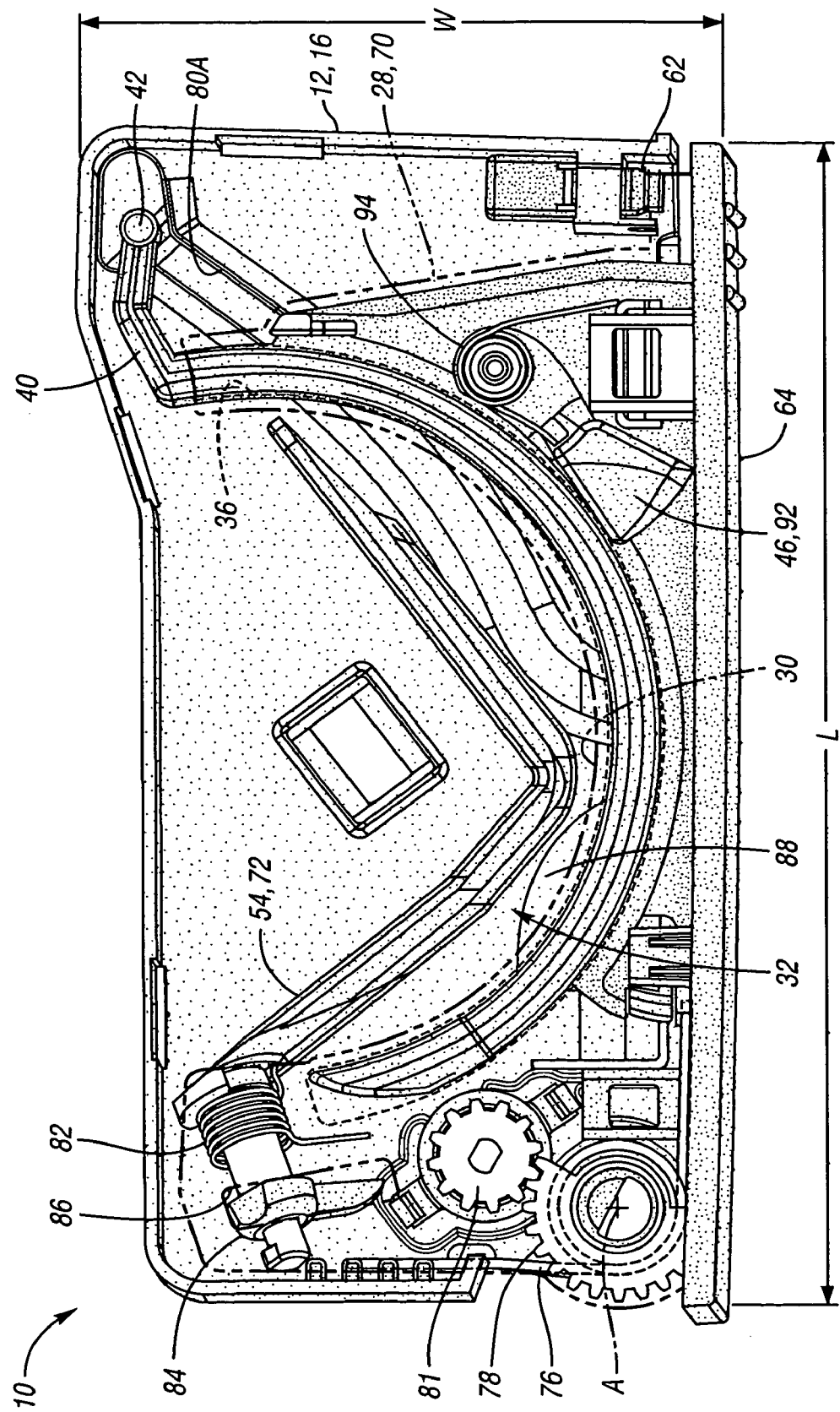
FIG. 2 is a schematic plan view of the cup holder assembly of FIG. 1 in a stored position with a top portion of a receptacle containing the partial ring being removed.

Referring now to FIG. 2, the base 28 (shown in phantom to enable a view of components housed between the base and the bottom portion 16 of the receptacle 12) is shown in a stored position 70. The top portion 14 of the receptacle 12 is removed in FIG. 2 in order to show the base 28 in a stored position 70 as well as to illustrate and discuss interior components. When the base 28 is in the stored position 70, the latch striker 60 (hidden in this view) is engaged with the latch mechanism 62 to retain the base 28 (i.e., to latch) in the stored position 70. In the stored position 70, the base 28 is substantially inside of the receptacle 12 in the receptacle opening 22 of FIG. 1. Furthermore, the second planar partial ring 40 is contained substantially within the channel 36 in a storable position (i.e., is collapsed with respect to the base forming the recess in the plane of the base) and is substantially juxtaposed with the recess 30. Additionally, the support arm 54 is also contained within the receptacle 12 in the receptacle opening 22 of FIG. 1 and is nested within the portion of the circle 32 formed by the recess 30. In this nested position 72 (which may also be referred to as a first position), the support arm 54 is pivoted and rotated with respect to its supportive position 56 shown in FIG. 1. When the base is in the stored position 70 with the partial ring 40 substantially contained within the channel 36 and the support arm 54 in the nested position 72, the cup holder assembly 10 is defined by the boundaries of the receptacle 12 and the cover 64 (i.e., the support arm 54, the partial ring 40 and the base 28 fit within the receptacle opening 22). With the base 28 in the stored position 70, the entire cup holder assembly 10 is characterized by the width W of the combined receptacle 12 and cover 64 and the length L of the receptacle 12 and cover 64 as well as the height H of the receptacle 12 and cover 64 shown in FIG. 1. As may be noted by the disposition of the partial ring 40 and recess 30 in FIG. 2, the width W of the receptacle 12 and cover 64 is less than the diameter D1 of the circumferential support 28, 40 formed by the base 28; and the partial ring 40 when the base is in the use position 38 of FIG. 1. Accordingly, the ability of the partial ring 40 to be stored within the channel 36 of the base 28, as well as the ability of the support arm 54 to pivot and rotate such that it is nested within the recess 30 formed by the base 28, allows for a very compact receptacle 12. Accordingly, the cup holder assembly 10 utilizes a minimum of space (i.e., the size of the slot 66 required to support the cup holder assembly 10 within the vehicle structure 68 is minimized by the compact arrangement of the above described components).

To move the base 28 from the stored position 70 of FIG. 2 to the use position 38 of FIG. 1, pressure is manually applied at the cover 64 in the vicinity of the latch mechanism 62 to unlatch the latch striker 60 from the latch mechanism 62. When the latch striker 60 is unlatched from the latch mechanism 62, a main torsion spring 76 which is concentrically disposed about the pivot axis A biases the base 28 towards the use position 38 of FIG. 1. A gear 78 is integrally formed by the base 28 about the pivot axis A. As the base 28 moves from the stored position 70 toward the use position 38, the gear 78 interacts with a motion damper 81 to dampen the pivoting movement of the base 28, allowing for a controlled opening motion. As the base 28 pivots, the first end 42 (i.e., the peg) of the partial ring 40 is guided along a track 80A formed in the bottom portion 16 of the receptacle 12. A corresponding track 80B shown in phantom in FIG. 1 is formed in the top portion 14 of the receptacle 12 to complement the track 80A in guiding the partial ring 40 as the pivoting of the base 28 causes the partial ring 40 to slide from the channel 36, out of juxtaposition with the recess 30, to extend between the receptacle 12 and the base 28, forming with the base 28 the circumferential support 28, 40 shown in FIG. 1. Thus, the peg 42 is captured within the track 80A, 80B such that the peg 42 follows the track 80A, 80B when the partial ring 40 slides in a direction out of the channel 36, thereby guiding the partial ring 40 in forming the circumferential support 28, 40 with the base 28. Conversely, when the base 28 is moved from the use position 38 of FIG. 1 to the stored position 70 of FIG. 2, the peg 42 is likewise trapped by the track 80A, 80B, to guide the partial ring 40 in sliding in the opposite direction in the channel 36.

Referring to FIG. 2, a support arm torsion spring 82 is connected to the support arm 54 and biases the support arm 54 toward the supportive position 56 shown in FIG. 1. A cam element 84 is connected to the support arm 54 and disposed within a cam element slot 86 formed in the base 28. A sloped surface 88 formed in the bottom portion 16 of the receptacle 12 leads to a cam element pivot opening 90 shown in FIG. 3. When the base 28 moves from the stored position 70 shown in FIG. 2 to the use position 38 shown in FIG. 1, the support arm 54 pivots outward following the base 28. The cam element 84 contacts and follows the sloped surface 88 as the support arm 54 moves forward. The support arm torsion spring 82 causes the cam element 84 to follow the sloped surface 88 which enables the cam element 84 to rotate, thus rotating the support arm downward and under the circumferential support 28, 40 shown in FIG. 1.

When the base 28 is moved from the use position 38 toward the stored position 70 via manual force applied to the cover 64, a biasing force of the support arm torsion spring 82 will be overcome as the cam element 84 is forced back up the sloped surface 88 and the support arm 54 returns to the nested position 72.

Referring again to FIG. 2, the stabilizing tab 46 is disposed in a retracted position 92 when the base 28 is in the stored position 70. A stabilizing element torsion spring 94 is connected to the stabilizing element 46 and biases the stabilizing element 46 toward the extended position 50 shown in FIG. 1. In the retracted position 92 shown in FIG. 2, the stabilizing tab 46 abuts the partial ring 40 and is contained substantially within the base 28. The partial ring 40 traps the stabilizing tab 46 and prevents pivoting of the stabilizing tab 46 to the extended position 50. However, when the partial ring 40 slides in the channel 36 to extend between the receptacle 12 and the base 28 as shown in FIG. 1, the partial ring 40 moves away from the stabilizing tab 46, allowing the stabilizing tab 46 to move to the extended position 50. Conversely, when the base 28 is moved from the use position 38 of FIG. 1 to the stored position 70 of FIG. 2, movement of the partial ring 40 within the channel 36 such that it is substantially contained within the channel 36 shown in FIG. 2 forces the stabilizing tab 46 back toward and into the retracted position 92.

Accordingly, as described above, by the use of torsion springs 76, 82 and 94, when pressure is applied to the door cover 64 to unlatch the latch mechanism 62, the configuration of the receptacle 12 and the base 28 (i.e., the grooved track 80A, 80B of the receptacle 12, the sloped surface 88 of the receptacle 12, the cam element pivot opening 90 of the receptacle 12, cam element slot 86 of the base 28, as well as the channel 36 of the base 28) cause the support arm 54 to pivot to a supportive position 56, the partial ring 40 to establish the circumferential support 28, 40 with the base 28 and the stabilizing tab 46 to move to an extended position 50. Notably, beverage containers sized between that of the first beverage container 44 and the second beverage container 52 may be also be supported by the cup holder assembly 10 in a stable manner because the stabilizing tab 46 is flexibly retractable toward the retracted position 92 with a multitude of intermediate positions between the retracted position 92 and the extended position 50 corresponding with beverage container radii between that of R1 and R2. The stabilizing tab torsion spring 94 will ensure a proper degree of extension of the stabilizing tab 46 against such intermediate size beverage containers as the stabilizing tab torsion spring 94 biases the stabilizing tab 46 toward the extended position 50 thus providing pressure against any intermediately sized beverage containers.

While the best mode for carrying out the invention has been described in detail, those familiar with the art to which this invention relates will recognize various alternative designs and embodiments for practicing the invention within the scope of the appended claims.

The invention claimed is:

1. A cup holder assembly comprising:
   a receptacle;
   a base defining a recess, said base being pivotable with respect to said receptacle between a stored position in which said base is substantially inside of said receptacle and a use position in which said base is at least partially outside of said receptacle; and
   a partial ring supported by said receptacle and being sufficiently slidable in one direction with respect to said base such that said partial ring is storable substantially within said base when said base is in said stored position and sufficiently slidable in another direction with respect to said base to extend sufficiently out of said base when said base is in said use position to cooperatively form with said base a circumferential support for receiving and at least partially supporting a container; wherein said receptacle forms a grooved track, a portion of said partial ring being captured within said track when said partial ring slides in said one direction with respect to said base, said track thereby guiding said partial ring in forming said circumferential support with said base.

2. The cup holder assembly of claim 1, further comprising:
a support arm pivotably connected to said base, and pivotable between a first position wherein said arm is nested substantially within said recess and is coplanar with said base, and a second position wherein said arm extends at least partially below said base for supporting said container, said arm pivoting between said first and second positions in conjunction with said base pivoting between said stored position and said use positions, respectively.

3. The cup holder assembly of claim 2, further comprising:
a cam element connected to said arm; and
wherein said receptacle forms a sloped surface, said cam element following said sloped surface as said base pivots from said stored position to said use position to permit pivoting of said arm from said first position to said second position.

4. The cup holder assembly of claim 1, further comprising:
a torsion spring biasing said base toward said use position; and
a latch operable for latching said base in said stored position;
wherein said torsion spring pivots said base from said stored position to said use position when said latch is unlatched.

5. The cup holder assembly of claim 4, further comprising:
a gear disposed concentrically with said torsion spring; and
a motion damper engaged with said gear;
wherein pivoting of said base via said torsion spring from said stored position to said use position is dampened by said motion damper.

6. The cup holder assembly of claim 1, wherein said circumferential support is characterized by a first radius and further comprising:
a stabilizing tab pivotably connected to said base and movable between a retracted position in which said stabilizing tab is contained substantially within said base and an extended position in which said stabilizing tab extends from said base;
said stabilizing tab cooperating with said base and said partial ring to form an alternate circumferential support characterized a second radius.

7. The cup holder assembly of claim 6, wherein said stabilizing tab abuts said partial ring when said stabilizing tab is in said retracted position and said base is in said stored position to prevent movement of said stabilizing tab to said extended position when the base is in the stored position and to permit movement of said stabilizing tab to said extended position when said partial ring slides in said another direction with respect to said base to extend sufficiently out of said base.

8. The cup holder assembly of claim 1, wherein said base forms a channel, said partial ring being sufficiently slidable in said channel in said one and said another directions such that said partial ring is storable substantially within said channel when said base is in said stored position and is sufficiently slidable in said channel in said another direction to extend sufficiently out of said channel when said base is in said use position to cooperatively form with said base said circumferential support.

9. A cup holder assembly comprising:
a receptacle having structure forming a grooved track and a sloped surface;
a base defining a recess and having structure forming a channel; said base being pivotably connected to said receptacle and pivotable between a stored position and a use position;
a partial ring captured at one end within said grooved track;
a support arm pivotably connected to said base;
a cam element connected to said arm;
said partial ring being substantially contained within said channel and said arm being nested within said recess and coplanar with said base when said base is in said stored position;
said partial ring being slidable along said grooved track and substantially out of said channel to cooperate with said base in forming a circumferential support characterized by a first radius and said cam element following said sloped surface to pivot said arm to extend below said base when said base pivots from said stored position to said use position, said circumferential support and said arm cooperating to receive and support a container characterized by a first size;
a stabilizing tab pivotably connected to said base and abutting said partial ring when said base is in said stored position such that said partial ring traps said stabilizing tab within said base when said base is in said stored position; and
said stabilizing tab pivoting to extend from said base when said base is in said use position, said stabilizing cab and said circumferential support thereby establishing an alternate support characterized by a second radius less than said first radius for receiving and supporting a different container characterized by a second size smaller than said first size.

10. The cup holder assembly of claim 9, wherein said circumferential support is characterized by a first diameter; wherein said receptacle is characterized by a width and a length; and wherein said width is less than said first diameter.

11. A cup holder assembly comprising:
a receptacle;
a base configured with a recess and pivorable in a common plane with respect to said receptacle between a stored position and a use position;
a partial ring supported by said base and movable in said common plane between a storable position juxtaposed with said recess and a usable position out of juxtaposition with said recess to form with said base a support for a container when the base is not stored;
a support arm pivotably connected to said base, and pivotable between a first position wherein said arm is nested substantially within said recess and is coplanar with said base, and a second position wherein said arm extends at least partially below said base for supporting said container, said arm pivoting between said first and second positions in conjunction with said base pivoting between said stored position and said use position, respectively;
a cam element connected to said arm; and
wherein said receptacle forms a sloped surface, said cam element following said sloped surface as said base pivots from said stored position to said use position to permit pivoting of said arm from said first position to said second position, respectively.

12. The cup holder assembly of claim 11, wherein said base forms a channel, said partial ring sliding in said channel when said partial ring moves between said stored and use positions.

13. The cup holder assembly of claim 12, wherein said receptacle forms a grooved track, a portion of said partial ring being captured within said track when said partial ring slides in said channel, said track thereby guiding said partial ring in forming said circumferential support with said base.

14. The cup holder assembly of claim 11, wherein said circumferential support is characterized by a first radius and further comprising:
- a stabilizing tab pivotably connected to said base and movable between a retracted position in which said stabilizing tab is contained substantially within said base and an extended position in which said stabilizing tab extends from said base;
- said stabilizing tab cooperating with said base and said partial ring to form an alternate circumferential support characterized by a second radius, said second radius being less than said first radius.

* * * * *